Dec. 27, 1932.    B. STOCKFLETH    1,892,178
METHOD OF MAKING BEARING SLEEVES
Filed Dec. 15, 1930
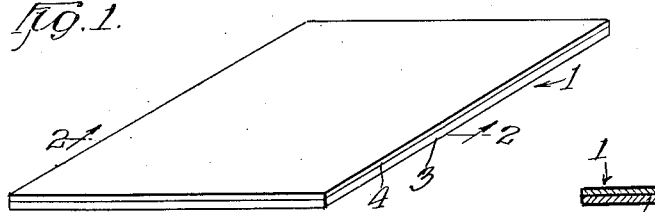
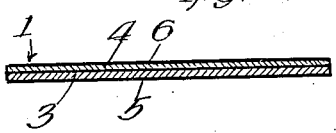
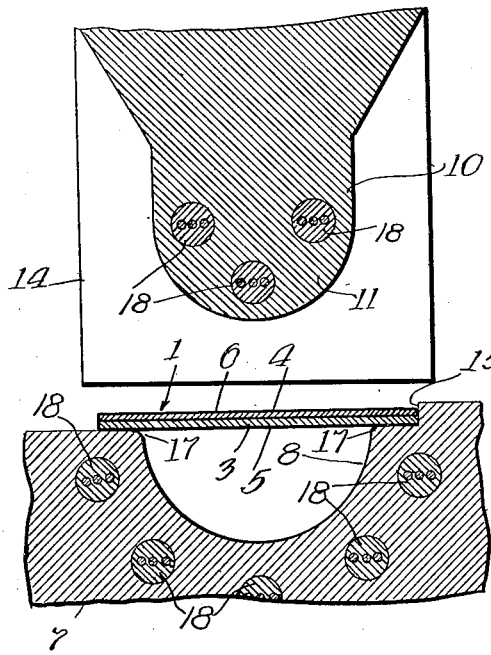
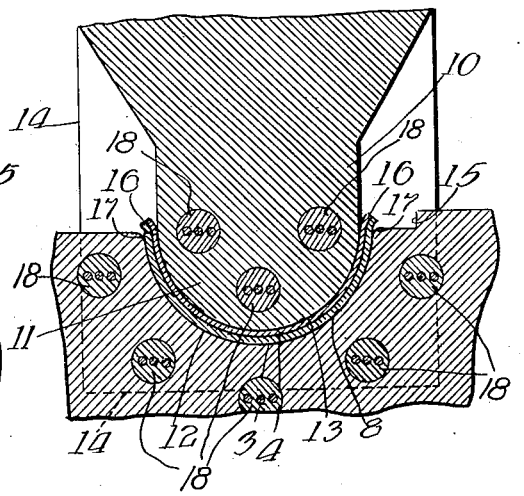
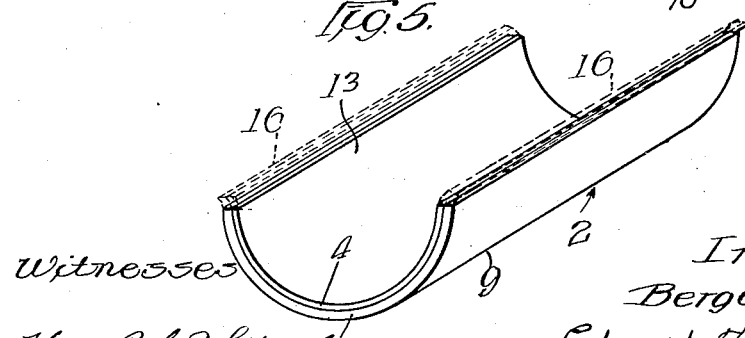
Inventor
Berger Stockfleth
By Edward Fay Wilson
Atty
Witnesses
Harry L. White Patented Dec. 27, 1932

1,892,178

UNITED STATES PATENT OFFICE

BERGER STOCKFLETH, OF NILES, MICHIGAN, ASSIGNOR, BY MESNE ASSIGNMENTS, TO THE CLEVELAND GRAPHITE BRONZE COMPANY, OF CLEVELAND, OHIO, A CORPORATION OF OHIO

METHOD OF MAKING BEARING SLEEVES

Application filed December 15, 1930. Serial No. 502,442.

This invention relates to improved means and methods for making half-cylindrical bearing sleeves. Usually, two of these half-sleeves are used to make a cylindrical bearing sleeve for use in a bearing housing such as the main bearings of an automobile engine.

The sleeves to which this invention relates consist of a harder metal backing shell and a bearing metal lining, and they may or may not have end flanges. Usually, the backing metal is sheet steel and the bearing metal lining is usually some grade of Babbitt metal.

This present invention relates to the rapid production of such half-sleeves from prepared bi-metal strips which have been accurately formed as to thickness and the production of the finished accurately sized sleeves by but one operation of heavy forming and squeezing or pressing dies.

Heretofore, so far as I am aware, the only practicable method has been to form the steel backs, then the bearing metal lining has been applied in some manner to form a bi-metal sleeve, then this sleeve was finished in dies under very heavy pressure, sufficient to compact the metal of the sleeve and finish the sleeve to desired dimensions within the allowable tolerances according to the use to which the sleeve was to be put.

In accordance with the present invention, the bi-metal sleeve is formed from a flat bi-metal strip or piece and is then compressed and finished in one operation.

The material is preferably cut into suitable sized flat pieces or sections and these fed one by one to the machine.

The most efficient method heretofore found practicable for making lined bearing sleeves was to first form the steel backs approximately to size, then cast on the bearing metal lining and then size and finish the sleeve in the heavy finishing press, all of which had to be done under the difficulties of hot dies.

Under the present method, while it is desirable to work the bi-metal pieces under temperatures which render the bearing metal malleable and not brittle, the temperatures do not need to be high enough to melt the bearing metal and it is not necessary to maintain the dies at such a high temperature as formerly.

Furthermore, in the present method, the bonding of the bearing metal to the backing metal is accomplished while the backing metal is in flat condition and the very fact that the flat bi-metal is bent to curved form with the bearing metal on the inner surface and then the metal of the whole sleeve is compressed tends to improve the bond.

The invention will be more readily understood from the following description taken in conjunction with the accompanying drawing in which the heavy forming and squeezing dies are very simply illustrated.

In said drawing:

Fig. 1 is a perspective view of a piece of bi-metal sheet which I make use of in the formation of bi-metal bearing sleeves;

Fig. 2 is a sectional view on the line 2—2 of Fig. 1;

Fig. 3 is a fragmentary view of the dies of a forming and squeezing press suitable for forming half cylindrical bearing sleeves out of the flat pieces, and showing the bi-metal piece in flat condition;

Fig. 4 is a similar sectional view illustrating the condition at the end of the pressing operation; and Fig. 5 is a perspective view of a sleeve showing the extruded edge portions in dotted lines.

In said drawing, 1 illustrates a piece of bi-metal sheet such as I make use of in my improved method of making bi-metal bearing sleeves.

Such bi-metal sheet is preferably made by passing a flat strip of steel through a body of molten bearing metal and suitable devices by which a coating of uniform thickness of the bearing metal is applied. Preferably, though not necessarily, the bi-metal strip is compressed as to thickness before being cut into pieces such as that shown at 1, each of which is of a size suitable to produce a half-cylindrical bearing sleeve 2, such as is shown in Fig. 5.

The flat piece 1, as best shown in Fig. 2, consists of two parts, a flat sheet 3 of a harder metal suitable for the back of the sleeve 2, and a coating 4 of a suitable bearing metal such as Babbitt metal bonded to one face of the steel sheet.

Preferably the steel has a coating of tin, indicated at 5, on its opposite face and a layer 6 of suitable bonding metal such as tin is applied to the steel strip to assist in bonding the bearing metal thereto.

The flat bi-metal pieces, having been prepared as indicated, are formed into the half bearing sleeves in one operation.

In Fig. 3, 7 illustrates the lower or female die provided with a substantially half-cylindrical die opening 8 of the form and dimensions of the back or outer surface 9 of the sleeve 2, and 10 illustrates the upper co-operative die, its lower end 11 being half-cylindrical in form and adapted to co-operate with the lower die 7 to form the strip 1 into half-cylindrical form, as shown at 12 in Fig. 4, wherein the upper die is shown as having been forced down into the die opening 8 and as having formed the flat piece 1 into half-cylindrical form. The lower end 11 of the upper die 10 is accurately of the form and dimensions desired for the inner surface 13 of the completed sleeve 2.

The upper die 10 is provided with end closure flanges 14 to close the ends of the die space and prevent the escape of metal at the ends.

The lower die is provided with a stop shoulder 15 at one side against which one edge of the piece 1 is placed in positioning it in the press.

The pressure applied in the forming operation is sufficient to compress the metal to the extent of causing it to be actually elongated circumferentially. This action is indicated by the extruded edges 16 shown at the sides of the die members, Fig. 4.

Such elongation of the metal under the tremendous pressure necessary for such results causes a desired ironing out or flattening of the metal.

The resultant sleeve is accurately of the size and dimensions of the forming dies and is uniform in thickness.

The longitudinal edges 17 of the die opening 8 are preferably rounded off slightly to prevent any scraping action on the back of the piece 1 in the forming operation.

The tin coating 5 on the back assists in the forming operation as it acts to some extent as a lubricant in the forming down of the sheet and also in the elongation of the metal in the final squeezing action. This reduces the power necessary to apply, reduces wear on the press and results in more accurate sleeves.

As indicated at 18, some suitable heating means, such as electric heaters, may be used to maintain the dies at a desired temperature.

Preferably, though not necessarily, the shells 1 are pre-heated, before being placed in the press, to a temperature at which the bearing metal is malleable but not hot enough to melt the bonding metal although, in some instances, the heat may be sufficient to melt the bonding metal.

Preferably, the temperature is slightly less than the melting point of the bonding metal. Under such conditions, when the sizing pressure is applied, the internal friction in the metal raises the temperature slightly and thus further softens the bonding metal. This action assists in the amalgamation of the bearing metal with the bonding metal and the bonding metal with the metal of the back.

In Fig. 5, it is indicated that the extruded edge portions 16 are removed, the resultant sleeve being accurately of the size required, whether that be half-cylindrical or otherwise.

As many modifications of the invention will readily suggest themselves to one skilled in the art, I do not limit or confine the invention to the specific mode of procedure herein illustrated and described, except within the scope of the appended claims.

I claim:

1. The herein described method of making bi-metal bearing sleeves which consists in providing pieces of bi-metal in flat form each of suitable size for forming a half-cylindrical bearing sleeve, placing one of the pieces in flat form upon a suitable half-cylindrical die, forcing a suitable plunger down upon the flat piece to form the flat piece into the die and, by the continuous operation of the plunger pressing the formed piece between the die and the plunger with sufficient pressure to thin the sleeve radially and cause the metals of the sleeve to be elongated in a direction substantially parallel with the surfaces between which it is pressed.

2. The invention as defined in claim 1, the completing pressure being sufficient to extrude some of the metals of the sleeve from between the die and plunger, the metals being extruded substantially equally.

3. The invention as defined in claim 1, the final forming pressure being sufficient to extrude some of the metals of the sleeve at the longitudinal edges of the formed sleeve, the metals being extruded substantially equally.

In testimony whereof, I have hereunto set my hand this 24th day of November, 1930.

BERGER STOCKFLETH.